US011470998B2

(12) United States Patent
Moon et al.

(10) Patent No.: US 11,470,998 B2
(45) Date of Patent: *Oct. 18, 2022

(54) AUTOMATIC BEVERAGE MAKER RESERVOIR HEATING SYSTEM

(71) Applicant: NuWave, LLC, Libertyville, IL (US)

(72) Inventors: Jung S. Moon, Long Grove, IL (US); Jian Jiang Liu, Jiangmen (CN)

(73) Assignee: NuWave, LLC, Vernon Hills, IL (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/553,288

(22) Filed: Aug. 28, 2019

(65) Prior Publication Data
US 2020/0054164 A1 Feb. 20, 2020

Related U.S. Application Data

(63) Continuation-in-part of application No. 16/296,519, filed on Mar. 8, 2019, now abandoned, which is a continuation-in-part of application No. 15/916,818, filed on Mar. 9, 2018, now Pat. No. 10,849,453, which is a continuation-in-part of application No. 15/867,012, filed on Jan. 10, 2018, now Pat. No. 10,827,874.

(60) Provisional application No. 62/444,453, filed on Jan. 10, 2017.

(51) Int. Cl.
A47J 31/52 (2006.01)
A47J 31/46 (2006.01)
A47J 31/06 (2006.01)
A47J 31/057 (2006.01)

(52) U.S. Cl.
CPC ......... *A47J 31/5253* (2018.08); *A47J 31/057* (2013.01); *A47J 31/0673* (2013.01); *A47J 31/461* (2018.08)

(58) Field of Classification Search
CPC .... A47J 31/5253; A47J 31/461; A47J 31/057; A47J 31/0673
USPC ......... 99/275, 280, 281, 282, 283, 285, 288, 99/289 R, 289 D, 295, 302 R, 307
See application file for complete search history.

(56) References Cited

U.S. PATENT DOCUMENTS

| 3,596,588 | A | * | 8/1971 | Moss | A47J 31/005 99/282 |
| 3,604,335 | A | * | 9/1971 | Lafitte | A47J 31/24 99/302 P |
| 4,389,925 | A | * | 6/1983 | Piana | A47J 31/368 99/289 R |
| 4,480,173 | A | * | 10/1984 | Butterfield | A47J 31/56 122/4 A |

(Continued)

Primary Examiner — Jimmy Chou
(74) Attorney, Agent, or Firm — Bishop, Diehl & Lee, Ltd.

(57) ABSTRACT

An automatic beverage maker having a water supply, a housing having a base, a body and a pod section, a sealed water tank within the housing body, a heating system for controlling the heating of water contained within the water tank, a first water line connecting the water supply to the water tank inlet, a second water e connecting the water outlet to the cavity of the housing pod section, a water pump for moving water from the water supply to the tank via the first water line and from the tank to the cavity of the housing pod section via the second water line. A drain line fluidly coupled to the sealed tank and having an open end for discharging water from the sealed water tank may also be used.

18 Claims, 5 Drawing Sheets

(56) References Cited

U.S. PATENT DOCUMENTS

| | | | | |
|---|---|---|---|---|
| 4,700,886 A * | 10/1987 | McGhee | F24H 9/2035 | 236/25 R |
| 5,207,148 A * | 5/1993 | Anderson | A47J 31/52 | 99/281 |
| 6,061,221 A * | 5/2000 | Tihanyi | H03K 17/0822 | 361/103 |
| 6,082,247 A * | 7/2000 | Beaulicu | A47J 31/402 | 222/146.5 |
| 6,142,063 A * | 11/2000 | Beaulieu | A47J 31/56 | 99/283 |
| 7,578,230 B2 * | 8/2009 | Rahn | A47J 31/465 | 99/282 |
| 7,640,845 B2 * | 1/2010 | Woodnorth | A47J 31/469 | 99/300 |
| 7,861,646 B2 * | 1/2011 | Bockbrader | A47J 31/402 | 99/323.3 |
| 8,028,616 B2 * | 10/2011 | Van Der Meer | A47J 31/4482 | 99/284 |
| 8,095,242 B2 * | 1/2012 | Quah | A47J 31/56 | 700/283 |
| 8,122,814 B2 * | 2/2012 | Westra | A47J 31/52 | 99/323 |
| 8,783,165 B2 * | 7/2014 | Zhong | A47J 31/461 | 99/300 |
| 8,857,318 B2 * | 10/2014 | Zhong | A47J 31/5253 | 99/293 |
| 8,904,923 B2 * | 12/2014 | McCormick | A47J 31/4482 | 99/299 |
| 2003/0003208 A1 * | 1/2003 | Lassota | A47J 31/52 | 426/433 |
| 2003/0007544 A1 * | 1/2003 | Chang | G01K 1/026 | 374/100 |
| 2004/0079237 A1 * | 4/2004 | Denisart | A47J 31/36 | 99/275 |
| 2004/0194629 A1 * | 10/2004 | Jones | A47J 31/402 | 99/275 |
| 2005/0051033 A1 * | 3/2005 | Lassota | A47J 31/06 | 99/283 |
| 2005/0150391 A1 * | 7/2005 | Schifferle | A47J 31/4492 | 99/295 |
| 2005/0160917 A1 * | 7/2005 | Gantt | A47J 31/402 | 99/279 |
| 2006/0196363 A1 * | 9/2006 | Rahn | A47J 31/106 | 99/279 |
| 2007/0186780 A1 * | 8/2007 | Clark | A47J 31/32 | 99/275 |
| 2008/0095904 A1 * | 4/2008 | Sullivan | A47J 31/32 | 426/431 |
| 2008/0121109 A1 * | 5/2008 | Nicolai | A47J 31/56 | 99/281 |
| 2008/0148959 A1 * | 6/2008 | Bockbrader | A47J 31/402 | 99/323.3 |
| 2009/0183639 A1 * | 7/2009 | Quah | A47J 31/56 | 99/282 |
| 2009/0249962 A1 * | 10/2009 | Westra | A47J 31/525 | 99/323.3 |
| 2009/0266239 A1 * | 10/2009 | Noordhuis | A47J 31/0647 | 99/295 |
| 2010/0206175 A1 * | 8/2010 | White | A47J 31/56 | 99/280 |
| 2010/0221394 A1 * | 9/2010 | Gaulard | F24H 9/2028 | 426/231 |
| 2010/0269703 A1 * | 10/2010 | Lin | A47J 31/56 | 99/281 |
| 2011/0094389 A1 * | 4/2011 | Coccia | A47J 31/52 | 99/280 |
| 2011/0113971 A1 * | 5/2011 | Aemisegger | A47J 31/46 | 99/302 R |
| 2011/0200726 A1 * | 8/2011 | Tinkler | A47J 31/3676 | 426/431 |
| 2011/0311694 A1 * | 12/2011 | Broennimann | A47J 31/4485 | 99/453 |
| 2012/0088022 A1 * | 4/2012 | Carbone | A47J 31/40 | 426/506 |
| 2012/0118164 A1 * | 5/2012 | Tonelli | B08B 9/0325 | 99/280 |
| 2012/0121768 A1 * | 5/2012 | Lai | A47J 31/42 | 426/231 |
| 2012/0171332 A1 * | 7/2012 | Lai | A47J 31/42 | 426/78 |
| 2012/0240783 A1 * | 9/2012 | Daburger | A47J 31/469 | 99/288 |
| 2013/0032036 A1 * | 2/2013 | Zhong | A47J 31/5253 | 99/294 |
| 2013/0087049 A1 * | 4/2013 | White | A47J 31/56 | 99/283 |
| 2013/0160653 A1 * | 6/2013 | McCormick | A47J 31/061 | 99/281 |
| 2013/0164422 A1 * | 6/2013 | McCormick | A47J 31/4435 | 426/433 |
| 2013/0298776 A1 * | 11/2013 | Mulder | A47J 31/5255 | 99/283 |
| 2013/0344205 A1 * | 12/2013 | Oh | B65D 85/8043 | 426/232 |
| 2014/0050464 A1 * | 2/2014 | Lin | H05B 3/48 | 392/478 |
| 2014/0057033 A1 * | 2/2014 | Lai | A47J 31/3623 | 426/433 |
| 2014/0069279 A1 * | 3/2014 | Upston | A47J 31/44 | 99/283 |
| 2014/0069353 A1 * | 3/2014 | Jimenez | A47J 31/56 | 122/14.31 |
| 2014/0076168 A1 * | 3/2014 | Lin | A47J 31/057 | 99/293 |
| 2014/0150663 A1 * | 6/2014 | Leforgeais | A47J 31/3614 | 99/283 |
| 2015/0128815 A1 * | 5/2015 | Lin | A47J 31/465 | 99/302 P |
| 2015/0208851 A1 * | 7/2015 | Grassia | A47J 31/0652 | 99/283 |
| 2015/0245736 A1 * | 9/2015 | Reyhanloo | A47J 31/605 | 426/231 |
| 2015/0359377 A1 * | 12/2015 | Graham | A47J 31/56 | 99/283 |
| 2016/0000252 A1 * | 1/2016 | Olsen | A47J 31/002 | 426/231 |
| 2016/0007797 A1 * | 1/2016 | Lin | A47J 31/36 | 99/295 |
| 2016/0007798 A1 * | 1/2016 | Jimenez | A47J 31/56 | 99/281 |
| 2016/0058242 A1 * | 3/2016 | Viet-Doan | A47J 31/462 | 99/283 |
| 2016/0106136 A1 * | 4/2016 | Gordon | A47J 31/407 | 426/477 |
| 2016/0183717 A1 * | 6/2016 | Ostan | A47J 31/56 | 99/280 |
| 2021/0186257 A1 * | 6/2021 | Toriumi | A47J 31/40 | |

* cited by examiner

AUTOMATIC BEVERAGE MAKER RESERVOIR HEATING SYSTEM

RELATED APPLICATIONS

The present application is a continuation-in-part of, and claims priority to U.S. patent application Ser. No. 16/296,519, titled "Automatic Beverage Maker Reservoir With Drain" filed on Mar. 8, 2019, which claims priority of U.S. patent application Ser. No. 15/916,818, titled "Automatic Beverage Maker" filed on Mar. 9, 2018, which is a continuation-in-part of U.S. patent application Ser. No. 15/867,012, titled "Automatic Beverage Maker" filed Jan. 10, 2018. The '519, '818 and '012 applications are incorporated herein by reference in their entirety.

TECHNICAL FIELD OF THE INVENTION

The present invention relates to automatic beverage makers. More specifically, the invention relates to a more accurate and safe heating system for an automatic beverage maker.

BACKGROUND OF THE INVENTION

Coffee has become an essential part of modern life. Some people can hardly function without their morning brew. Single-serving coffee makers (aka, pod brews) are popular home coffee makers because they can brew single cups of gourmet coffee in just a few seconds. But in order to keep the coffee tasting great, it is important to achieve the proper water temperature for brewing.

In fact, studies show that the optimal temperature for brewing coffee, tea, and hot cocoa is 192° F. This target is for the internal temperature of the water in the beverage machine/brewer hot-water tank/reservoir. The actual temperature of the brewed coffee, tea, or hot cocoa being dispensed is lower and can vary greatly based on cup temperature and cup material. Accordingly, the tank water temperature is critical to achieving the best brew possible.

One problem in achieving this optimal temperature is due, in part, to the inability to accurately sense the temperature of water in the hot-water tank. A temperature sensor inserted within the reservoir determines the temperature at the reservoir bottom. However, the hottest water will be at the top of the reservoir. For this reason, the water at the top may exceed the optimal temperature and cause a significant and potentially dangerous pressure increase within the sealed hot-water tank.

Further, prior brewing systems have only a single set temperature—preferably one which is at or near the temperature for optimal brewing. However, some people prefer a cooler brew, while others prefer hotter. Accordingly, these individuals are required to alter the final product in some manner—e.g., microwaving, adding ice, etc. These steps can negatively impact the flavor of the brewed beverage.

Until the invention of the present application, these and other problems in the prior art went either unnoticed or unsolved by those skilled in the art. The present invention provides a hot-water tank for a beverage maker which provides greater certainty as to the brewing temperature and provides options for raising and lowering the brewing temperature, all without sacrificing design, style or affordability.

SUMMARY OF THE INVENTION

There is disclosed herein an improved beverage maker which avoids the disadvantages of prior devices while affording additional structural and operating advantages.

Generally speaking, the automatic beverage maker comprises a water supply suitable for use in making a beverage, a housing having a base, a body and a pod-retention module, wherein the pod-retention module comprises a cavity for placement of a beverage pod to be used in making a beverage and a delivery opening for dispensing the beverage, a sealed water tank within the housing body, and having a water inlet and a water outlet, and a heating system. The preferred heating system comprises a heating element contacting an outer surface of the sealed water tank for heating water contained within the water tank, a temperature probe positioned within the sealed water tank such that the probe is at least partially submerged when the tank is filled with water, a first temperature sensor positioned within and proximate an end of the probe, a second temperature sensor positioned within the probe and spaced a distance from the first temperature probe, and a controller for activating the heating element in response to a threshold temperature sensed by at least one of the first temperature sensor and the second temperature sensor. The basic beverage maker also includes a water line connecting the water supply to the water inlet of the sealed tank, a second water line connecting the water outlet to the pod-retention module, and a water pump for moving water from the water supply to the sealed tank through the first water line and from the tank to the pod-retention module through the second water line.

In specific embodiments, the first and second temperature sensors each comprise a negative temperature coefficient (NTC) thermistor. The distance between the second temperature sensor and the first temperature sensor is preferably no less than about 10 mm, and most preferably no less than 15 mm. The first sensor is positioned to determine incoming water temperature—i.e., it is positioned proximate the water inlet—while the second sensor determines the temperature of water closest to the output line in the sealed tank.

In specific embodiments, the controller activates the heating element to maintain water within the tank at a first threshold temperature ($T_1$) as measured by the first temperature sensor. Likewise, the controller activates the heating element to maintain water within the tank at a second threshold temperature ($T_2$) as measured by the second temperature sensor. The first threshold temperature ($T_1$) is a brewing temperature, while the second threshold temperature ($T_2$) is a preheating temperature. Further, the first temperature threshold ($T_1$) is lower than the second temperature threshold ($T_2$).

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
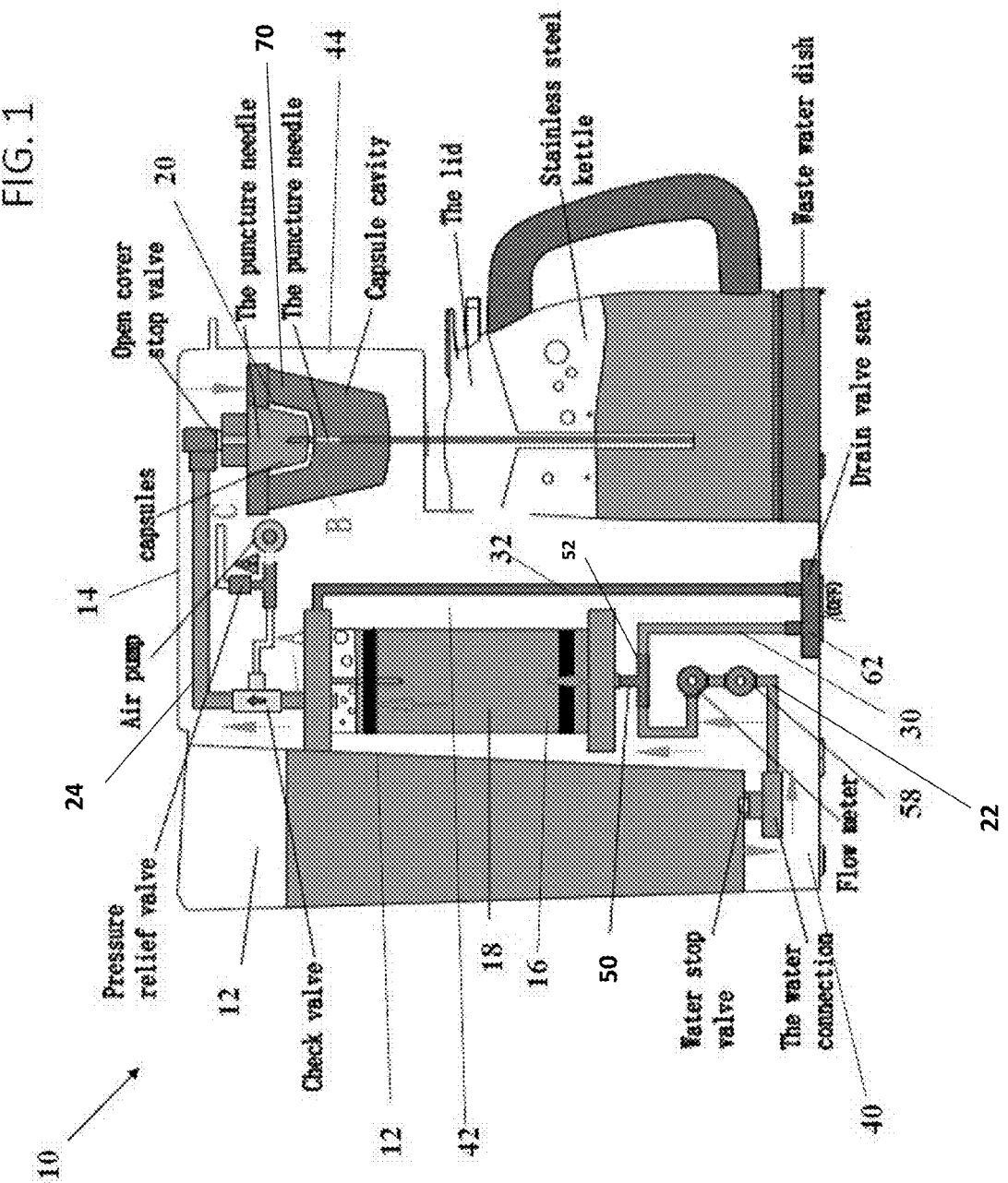
FIG. 1 is a schematic illustrating an embodiment of the disclosed automatic beverage maker.
Figure 2:
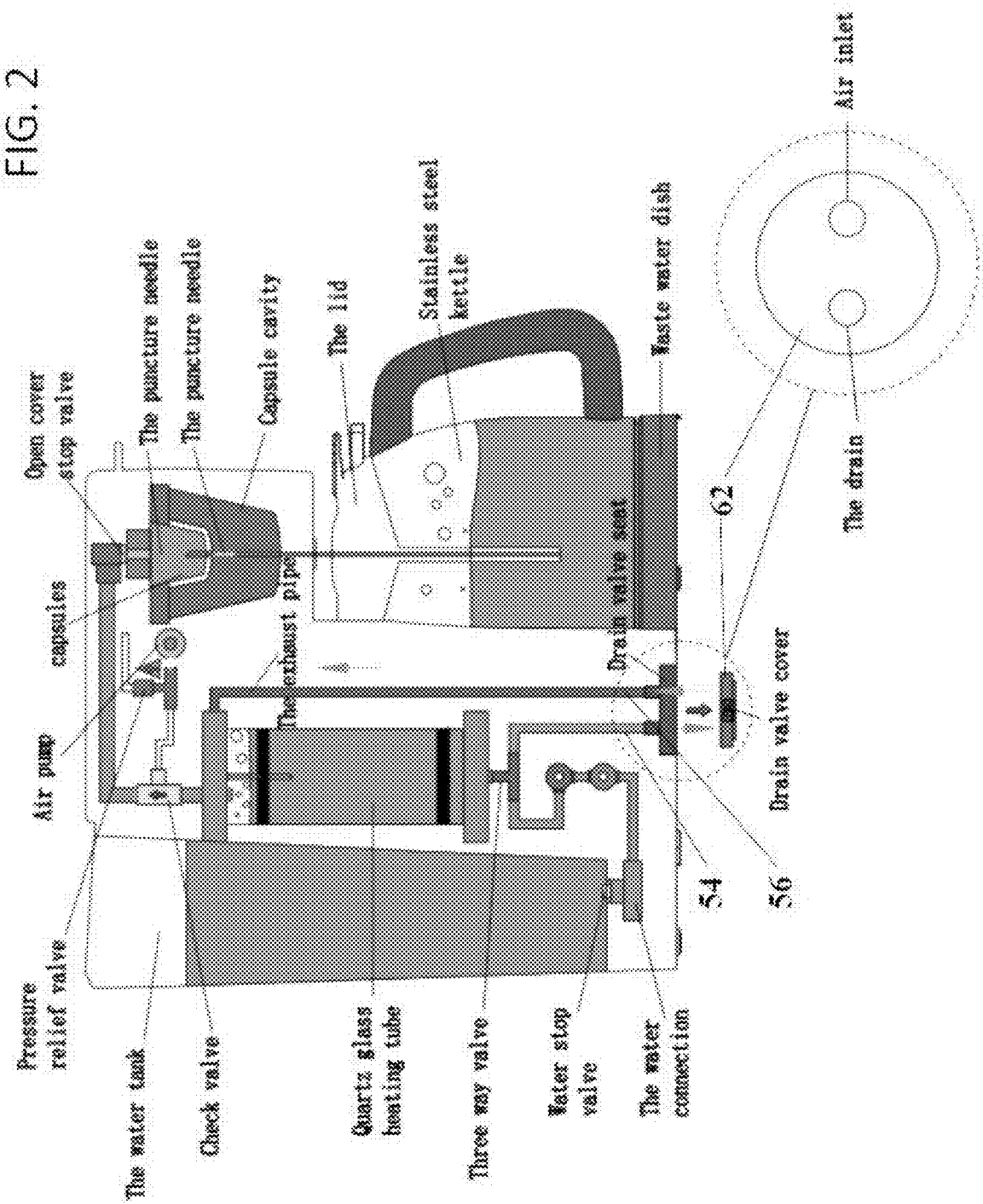
FIG. 2 is another schematic of the embodiment of the disclosed automatic beverage maker shown in FIG. 1.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-5, there is illustrated a beverage maker system, generally designated by the numeral 10. The particular illustrated beverage maker system 10 is for making hot beverages, such as tea and coffee. These systems are well-known in the art, utilizing sealed pods to produce single-servings of a hot beverage, such as coffee, tea or hot cocoa. The disclosed system 10 is comprised of a water reservoir 12 attached to a housing 14 having a pod-retention module 70. Positioned within the housing 14 is a sealed water tank 16 coupled to a heating system 74 to provide heated water to the pod-retention module 70. The heating system 74 is comprised of a heating element 18, a temperature probe 72, and a controller 76 electronically connected to the heating element 18 and probe 72. Water line 22 connects the reservoir 12 to the water tank 16, while water line 24 fluidly connects the water tank 16 to the pod-retention module 70.

In an alternate embodiment, the water reservoir 12, which typically requires manual refilling, may be provided by an on-demand water supply (not shown) using a dedicated water line connected to the system 10—i.e., directly to the sealed water tank 16. The dedicated water line as a water supply is preferred for high-use brewing systems.

Figure 4:
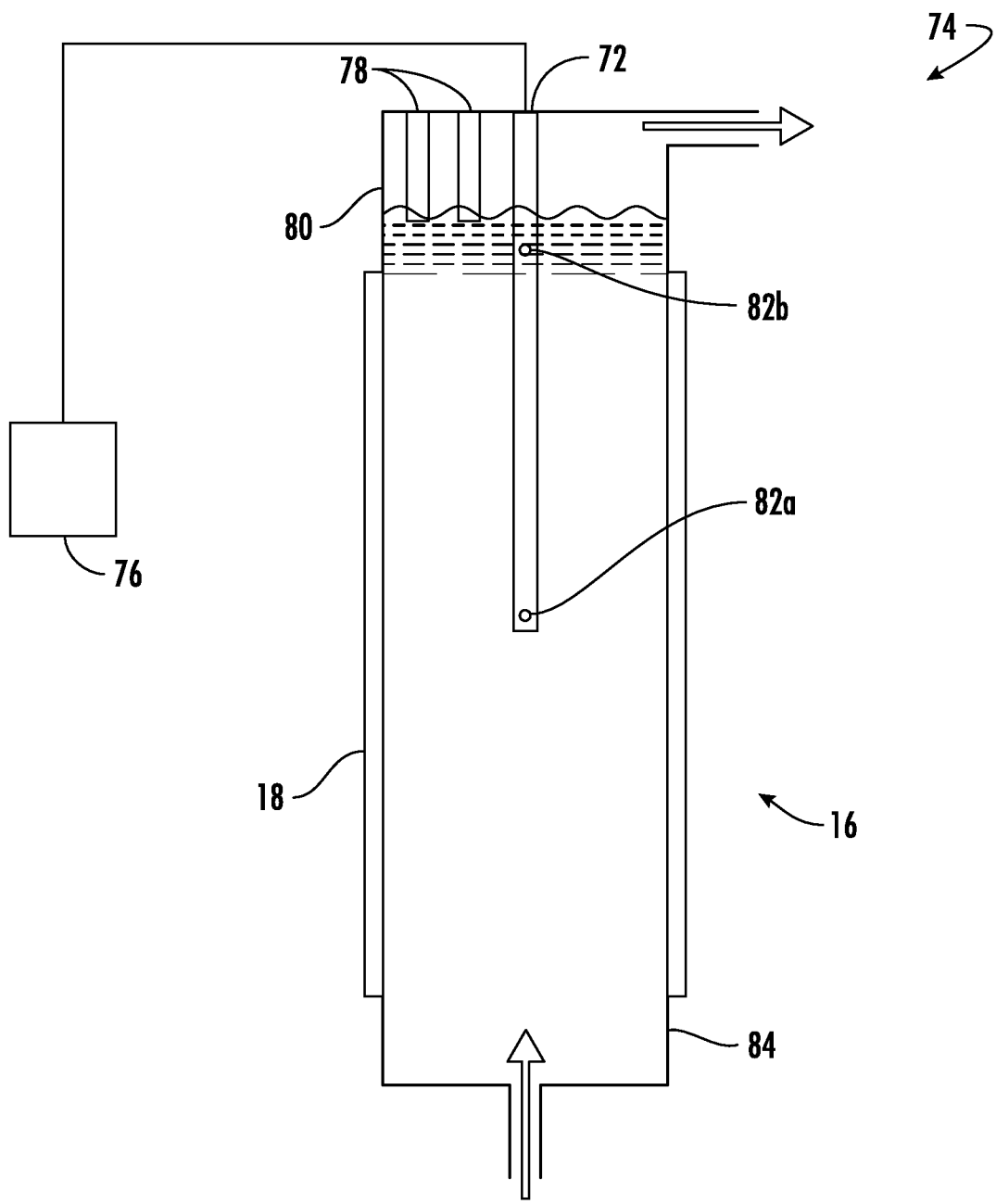
FIG. 4 is a schematic illustrating an embodiment of a temperature probe used for the disclosed beverage maker.

The heating element 18 is preferably a surface heater, as shown in FIG. 4, which wraps about the water tank 16 to heat water within the tank 16. Other types of heating elements as known to those skilled in the art may be suitable.

The pod-retention module 70 comprises a pod cavity 20 into which a suitable beverage pod (not shown) can be positioned. The module 70 can be configured to accept beverage pods for single-servings or for larger, carafe-sized beverage production.

Additional components may include a drain line 30, an air-line 32, and dual water level sensors 78, all of which are connected to the sealed water tank 16. The drain and air lines, 30 and 32 respectively, facilitate draining of the tank 16. The water level sensors 78 determine when a sufficient quantity of water for brewing is in the sealed tank 16.

The housing 14 is preferably constructed of a typical plastic material and includes a base 40, a body (or midsection) 42 and the pod-retention module 70. As illustrated in the FIGS., most of the components of the system 10 are positioned within and concealed by the body 42 of the housing 14. The reservoir 12 is typically detachable from an outer surface of the housing body 42, for cleaning purposes. The sealed tank 16 typically maintains a volume of water within and the heating element 18 keeps the volume of water warm while the system 10 is turned on. However, once the system 10 is turned off, the tank 16 may become a breeding ground for bacteria, molds, or the like. Accordingly, the ability to drain and properly flush the tank 16 on a regular basis helps maintain quality of the produced beverage.

The drain line 30 is preferably routed from a water inlet 50 for the water tank 16. A three-way valve 52 connected to the water inlet 50 is used to connect to both the first water line 22, which brings water to the tank 16 from the reservoir 12, and the tank drain line 30. While a separate water outlet may be created for the drain line 30, the use of the three-way valve 52 allows current beverage systems, which already have inlet lines, to be easily configured with a drain line without requiring modification to add a separate drain opening in the tank 16.

The air line 32 is preferably connected to the water tank 16 above the water line and allows air to flow into the tank 16 to replace water being drained from the tank. Both the air line 32 and the drain line 30 have ends 54 and 56 extending through the housing base 40 and opening at a bottom or side of the base 40. Preferably, a drain valve cover 62 attaches to both open ends, 54 and 56, to prevent drainage from tank 16. However, once the cover 62 is removed, water will drain from the tank 16 out the drain line 30 as air is pulled into the air line 32 until all water is removed from the tank 16. The drain valve cover 62 can then be replaced on the open ends 54 and 56.

Once all the water is removed, a cleaning cycle can be run to flush out the water tank 16. This can be accomplished by cycling through cleaning and rinsing steps, as needed. The cleaning step may require adding an appropriate cleaning solution to the reservoir 12, then turning the system 10 on to pump the solution into the water tank 16 via water pump 58. The draining procedure can then be used to remove the cleaning solution, as necessary. The rinsing step is similarly achieved using only water to flush through the water tank 16.

Referring to FIG. 4, an embodiment of the water tank heating system 74 is illustrated. As previously noted, the heating element 18 is preferably a surface heater which wraps around and contacts a substantial portion of the surface of the water tank 16. This helps provide a consistent heating of the water in the tank. Of course, as the warm water rises to the tank top 16T and the cooler water is injected from the tank bottom 16B, a temperature gradient is created in the tank 16.

Figure 3:
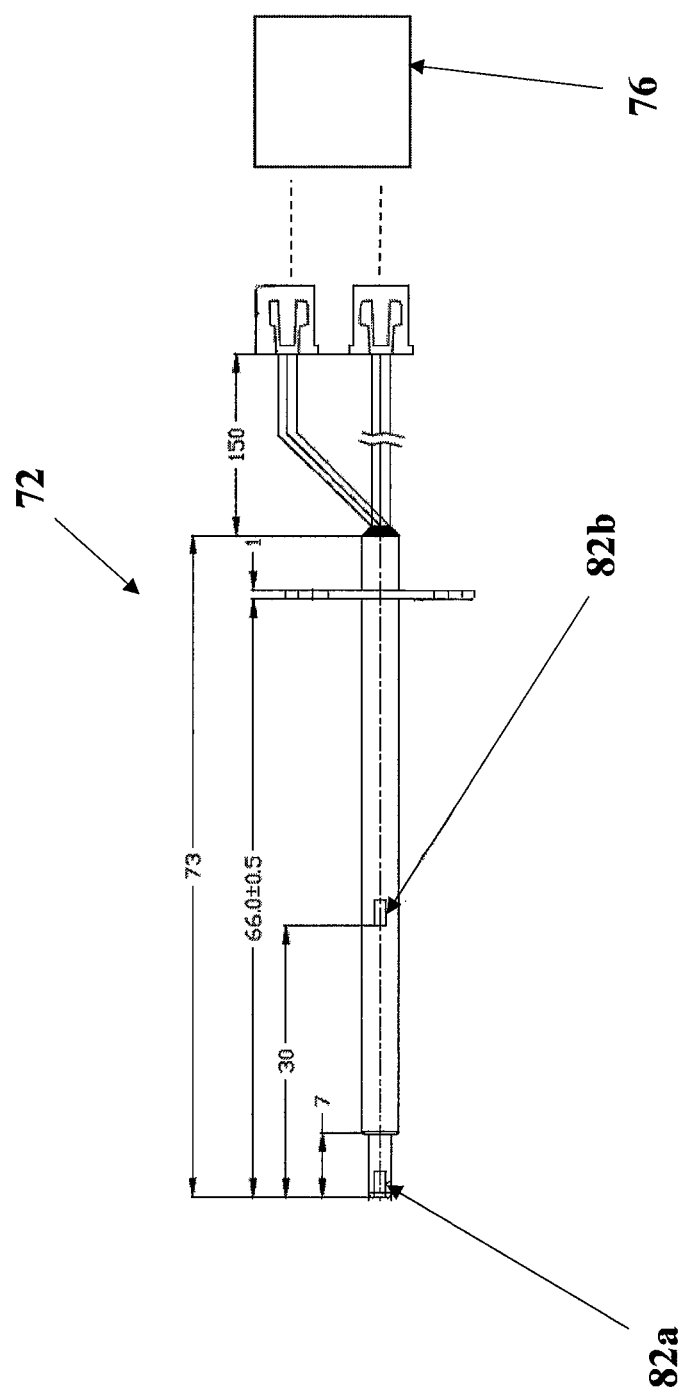
FIG. 3 is a schematic illustrating a temperature probe used for prior art brewing systems.

For this reason, as set forth in the schematic of FIG. 3, the temperature probe 72 comprises two temperature sensors 82a,b. The first sensor 82a is preferably positioned in the tip of the probe 72, as shown, and is used to determine a temperature of incoming water to the sealed tank 16. The first sensor 82a is coupled to a controller 76 (FIG. 3). The second sensor 82b is preferably positioned in the probe 72 a distance of at least about 10 mm, and preferably at least about 15 mm from the first sensor 82a—i.e., higher in the sealed hot water tank 16—and is used to determine a temperature of the outgoing water. The second sensor 82b is also coupled to the controller 76 (FIG. 3). Preferably, both sensors 820 are negative temperature coefficient (NTC) thermistors.

In operation, returning to FIG. 4, the first sensor 82a is used to control the brewing temperature ($T_1$) for the system 10, while the second sensor 82b is used to control the preheating temperature ($T_2$) of the system 10. The brewing temperature ($T_1$) is lower than the preheating temperature ($T_2$). The unique two sensor configuration provides at least two benefits for the current brewing system 10. First, measuring brewing temperature at the lower point ensures that the water being delivered to the pod-retention module 70 for brewing is at no less than the desired temperature. Second, providing a preheating temperature allows the water in tank 16 to be maintained at a temperature which prevents overheating and dangerously increasing the pressure in the sealed tank 16.

Figure 5:
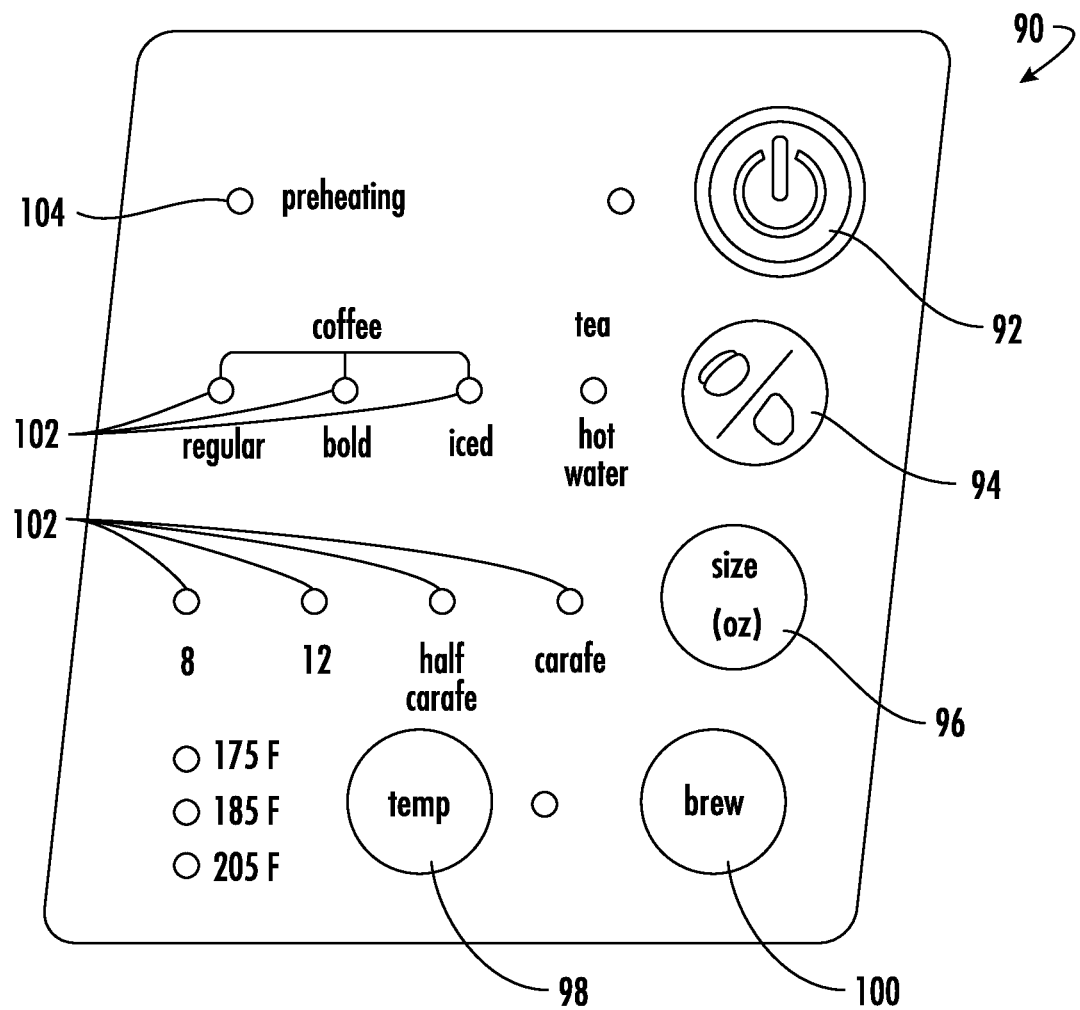
FIG. 5 is an embodiment of a control panel template used for the disclosed beverage maker.

With reference to FIG. 5, an embodiment of a template of the user interface 90 is shown. Along with the standard "on/off" button 92, the interface 90 provides a "strength" button 94 providing selection between three brew strengths and hot water, a "size" button 96 providing selection between several output sizes (e.g., 8 oz, 12 oz), a "temp" button 98 providing selection between water brew temperatures, and a "brew" button 100 for activating the brewing process. Lighted LEDs 102, including a "preheating" indicator 104, signal the current setting for each operation of the brew system 10.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An automatic beverage maker comprising:
   a water supply suitable for use in making a beverage;
   a housing having a base, a body and a pod-retention module, wherein the pod-retention module comprises a cavity for placement of a beverage pod to be used in making a beverage and a delivery opening for dispensing the beverage;
   a water tank within the housing body, and having an air inlet to facilitate draining of the water tank, a water inlet and a water outlet;
   a drain line fluidly coupled to the water tank and having an open end for discharging water from the water tank;
   a heating system comprising:
      a heating element contacting an outer surface of the water tank for heating water contained within the water tank;
      a temperature probe positioned within the water tank such that the probe is at least partially submerged when the water tank is filled with water;
      a first temperature sensor positioned within and proximate an end of the probe;
      a second temperature sensor positioned within the probe and spaced a distance from the first temperature sensor; and
      a controller for activating the heating element in response to a threshold temperature sensed by at least one of the first temperature sensor and the second temperature sensor;
   a first water line connecting the water supply to the water inlet of the water tank;
   a second water line connecting the water outlet to the pod-retention module; and
   a water pump for moving water from the water supply to the water tank through the first water line and from the water tank to the pod-retention module through the second water line;
   wherein the air inlet connects to the water tank proximate a top of the water tank to facilitate draining and the drain line connects to the water tank through the first water line.

2. The automatic beverage maker of claim 1, wherein the first temperature sensor and the second temperature sensor each comprises a negative temperature coefficient (NTC) thermistor.

3. The automatic beverage maker of claim 1, wherein the water tank further comprises an air inlet to facilitate draining of the water tank.

4. The automatic beverage maker of claim 1, further comprising a drain line valve cover to prevent discharge of water from the water tank.

5. The automatic beverage maker of claim 4, further comprising an air inlet line valve cover.

6. The automatic beverage maker of claim 5, wherein the drain line valve cover and the air inlet valve cover comprise a single valve cover.

7. The automatic beverage maker of claim 6, wherein the first water line and the drain line connect to the water inlet via a three-way valve.

8. The automatic beverage maker of claim 6, wherein the drain line and the air inlet each have an open end in the housing base.

9. The automatic beverage maker of claim 1, further comprising a drain valve cover detachable from the housing base.

10. The automatic beverage maker of claim 1, wherein the controller activates the heating element when brewing a beverage to heat water within the water tank to a first threshold temperature ($T_1$) as measured by the first temperature sensor.

11. The automatic beverage maker of claim 10, wherein during preheating the controller controls the heating element to maintain water within the water tank at a second threshold temperature ($T_2$) as measured by the second temperature sensor.

12. The automatic beverage maker of claim 10, wherein the first threshold temperature ($T_1$) is a brewing temperature.

13. The automatic beverage maker of claim 11, wherein the second threshold temperature ($T_2$) is a preheating temperature.

14. The automatic beverage maker of claim 11, wherein the first temperature threshold ($T_1$) is lower than the second temperature threshold ($T_2$).

15. An automatic beverage maker comprising:
    a water supply suitable for use in making a beverage;
    a housing having a base, a body and a pod-retention module, wherein the pod-retention module comprises a cavity for placement of a beverage pod to be used in making a beverage and a delivery opening for dispensing the beverage;
    a water tank within the housing body, and having a water inlet and a water outlet;
    a drain line fluidly coupled to the water tank and having an open end for discharging water from the water tank;
    a drain line valve cover to prevent discharge of water from the water tank through the drain line;
    a heating system comprising:
       a heating element contacting an outer surface of the water tank for heating water contained within the water tank;
       a temperature probe positioned within the water tank such that the probe is at least partially submerged when the water tank is filled with water;
       a first temperature sensor positioned within and proximate an end of the probe;
       a second temperature sensor positioned within the probe and spaced a distance from the first temperature probe; and a controller for activating the heating element in response to a threshold temperature sensed by at least one of the first temperature sensor and the second temperature sensor;

a first water line connecting the water supply to the water inlet of the water tank;

a second water line connecting the water outlet to the pod-retention module; and a water pump for moving water from the water supply to the water tank through the first water line and from the water tank to the pod-retention module through the second water line.

16. The automatic beverage maker of claim 15, further comprising an air inlet line valve cover.

17. The automatic beverage maker of claim 16, wherein the drain line valve cover and the air inlet valve cover comprise a single valve cover.

18. The automatic beverage maker of claim 15, wherein the first water line and the drain line connect to the water inlet via a three-way valve.

* * * * *